(12) United States Patent
Penner

(10) Patent No.: US 8,162,520 B2
(45) Date of Patent: Apr. 24, 2012

(54) VEHICLE CONSOLE ASSEMBLIES WITH CUP HOLDER AND STORAGE BIN LIGHTING ASSEMBLY

(75) Inventor: Benjamin Warren Penner, Ann Arbor, MI (US)

(73) Assignee: Toyota Motor Engineering & Manufacturing, Erlanger, KY (US)

( * ) Notice: Subject to any disclaimer, the term of this patent is extended or adjusted under 35 U.S.C. 154(b) by 324 days.

(21) Appl. No.: 12/542,227

(22) Filed: Aug. 17, 2009

(65) Prior Publication Data

US 2011/0037287 A1  Feb. 17, 2011

(51) Int. Cl.
*B60Q 3/02* (2006.01)
*B60Q 1/26* (2006.01)

(52) U.S. Cl. ......... 362/488; 362/546; 362/154; 362/253

(58) Field of Classification Search .................. 362/488, 362/491, 411, 546, 154, 155, 253; 296/24.34, 296/37.8; 220/738
See application file for complete search history.

(56) References Cited

U.S. PATENT DOCUMENTS

| | | | |
|---|---|---|---|
| 4,202,030 A * | 5/1980 | Kimura | 362/489 |
| 4,446,508 A | 5/1984 | Kinzie | |
| 5,590,945 A | 1/1997 | Simms | |
| 5,647,657 A | 7/1997 | Damasky et al. | |
| 5,915,832 A * | 6/1999 | Baird, Sr. | 362/551 |
| 6,139,176 A | 10/2000 | Hulse et al. | |
| 6,168,302 B1 | 1/2001 | Hulse | |
| 6,234,439 B1 * | 5/2001 | Townsend et al. | 248/311.2 |
| 6,419,379 B1 * | 7/2002 | Hulse | 362/488 |
| 6,719,344 B2 * | 4/2004 | Ono et al. | 296/24.34 |
| 6,896,387 B2 * | 5/2005 | Renfro | 362/602 |
| 6,974,238 B2 | 12/2005 | Sturt et al. | |
| 7,654,680 B2 * | 2/2010 | Kukucka et al. | 362/84 |
| 2002/0102058 A1 | 8/2002 | Hulse | |
| 2007/0121313 A1 | 5/2007 | Moell | |
| 2007/0139943 A1 * | 6/2007 | Bone et al. | 362/488 |
| 2007/0247836 A1 * | 10/2007 | Seidl et al. | 362/154 |
| 2008/0122241 A1 * | 5/2008 | Blackmore et al. | 296/37.8 |
| 2008/0180963 A1 * | 7/2008 | Clauw et al. | 362/489 |
| 2008/0266853 A1 | 10/2008 | Goto | |
| 2009/0175049 A1 * | 7/2009 | Lota | 362/488 |
| 2010/0315826 A1 * | 12/2010 | Anderson et al. | 362/511 |

* cited by examiner

*Primary Examiner* — Ismael Negron
(74) *Attorney, Agent, or Firm* — Dinsmore & Shohl LLP

(57) ABSTRACT

A lighting assembly for illuminating a console assembly of a vehicle includes a cup holder assembly in the console assembly having a cup-receiving volume. A storage bin in the console assembly has a storage volume. A light source assembly is mounted within the console assembly. The light source assembly illuminates the cup-receiving volume directly and illuminates the storage bin indirectly.

19 Claims, 10 Drawing Sheets

VEHICLE CONSOLE ASSEMBLIES WITH CUP HOLDER AND STORAGE BIN LIGHTING ASSEMBLY

TECHNICAL FIELD

The present specification generally relates to vehicle console assemblies and, more specifically, to vehicle console assemblies with associated vehicle lighting systems for illuminating cup holder and storage bin assemblies.

BACKGROUND

Center consoles for vehicles come in many shapes and sizes and may contain any number of features. Some center consoles may include entertainment and/or climate system controls, auxiliary power outlets, and/or window controls. It is also not uncommon to provide a cup holder and/or storage bin in a center console.

While it is generally known to incorporate lighting into a center console, often it is desirable to minimize the number of light sources while illuminating more areas within the vehicle, which can reduce cost.

SUMMARY

In one embodiment, a lighting assembly for illuminating a console assembly of a vehicle includes a cup holder assembly in the console assembly having a cup-receiving volume. A storage bin in the console assembly has a storage volume. A light source assembly is mounted within the console assembly. The light source assembly illuminates the cup-receiving volume directly and illuminates the storage bin indirectly.

In another embodiment, a console assembly for a vehicle includes a cup holder assembly having a first cup holder having a first cup-receiving volume and a second cup holder having a second cup-receiving volume. A lighting assembly includes a single light source mounted within the console that illuminates both the first cup-receiving volume and the second cup receiving volume directly through a lens including a first arm portion connected to the first cup holder and a second arm portion connected to the second cup holder.

In another embodiment, a console assembly includes a lighting assembly for illuminating the console assembly. The console assembly includes a cup holder assembly in the console assembly including a cup holder including a side wall at least partially defining a cup-receiving volume. A storage bin is in the console assembly having a storage volume. A light source assembly is mounted within a compartment in the console assembly. The cup-receiving volume is illuminated by directing light through an opening in the side wall of the cup holder and the storage volume is illuminated using reflected light passing through a passageway in the compartment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicle console systems and vehicle lighting systems, and more particularly, to vehicle lighting systems for illuminating areas within a console assembly of a vehicle. The vehicle lighting systems may include a single light source that may be used to illuminate multiple areas within the console assembly simultaneously, such as multiple cup holders and/or a cup holder and storage bin. Various embodiments of the console assemblies and vehicle lighting systems and the operation of the console assemblies and vehicle lighting systems will be described in more detail herein.

Figure 1:
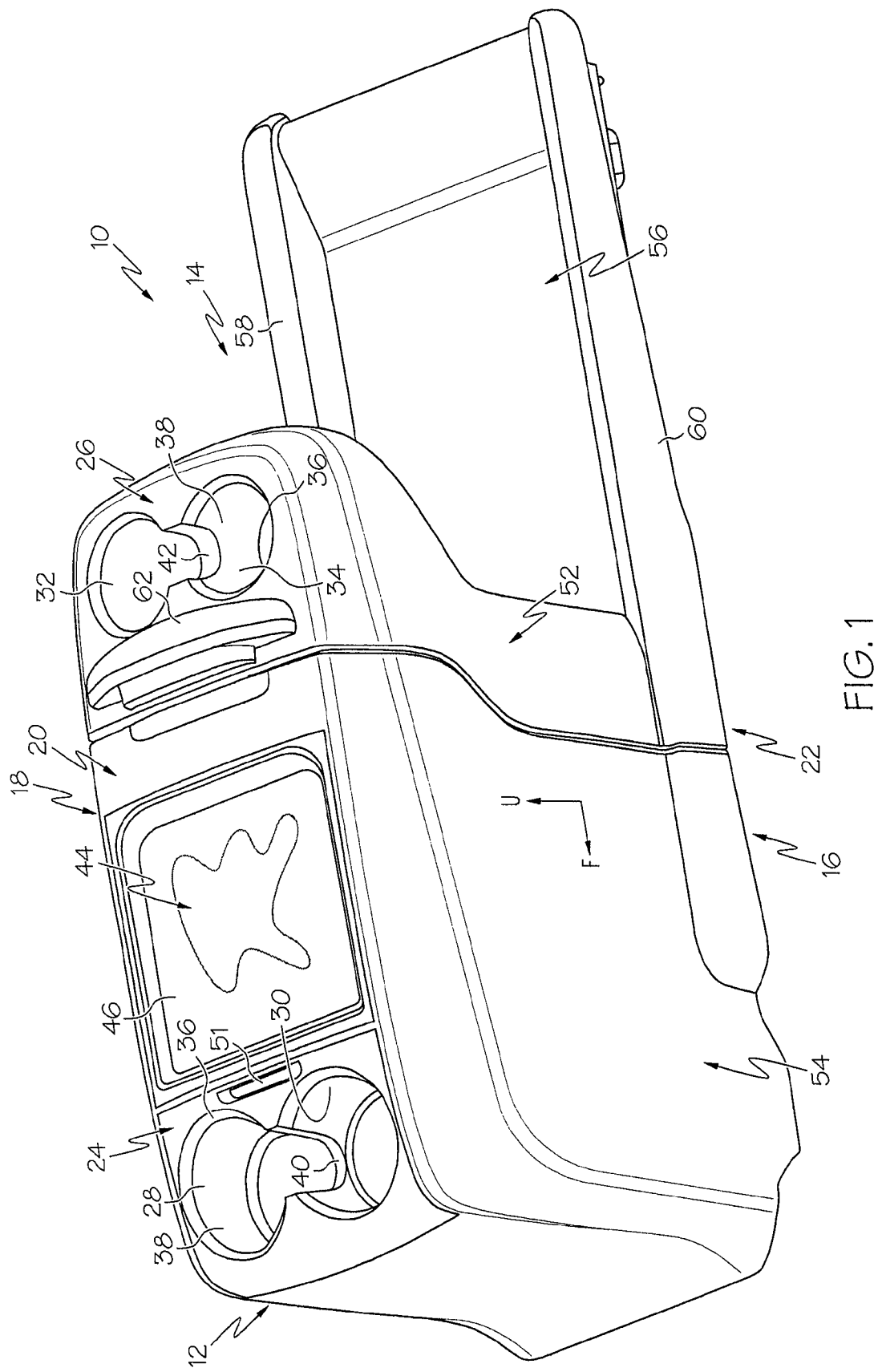
FIG. 1 is a perspective view of a console assembly in a collapsed configuration according to one or more embodiments shown and described herein.
Figure 2:
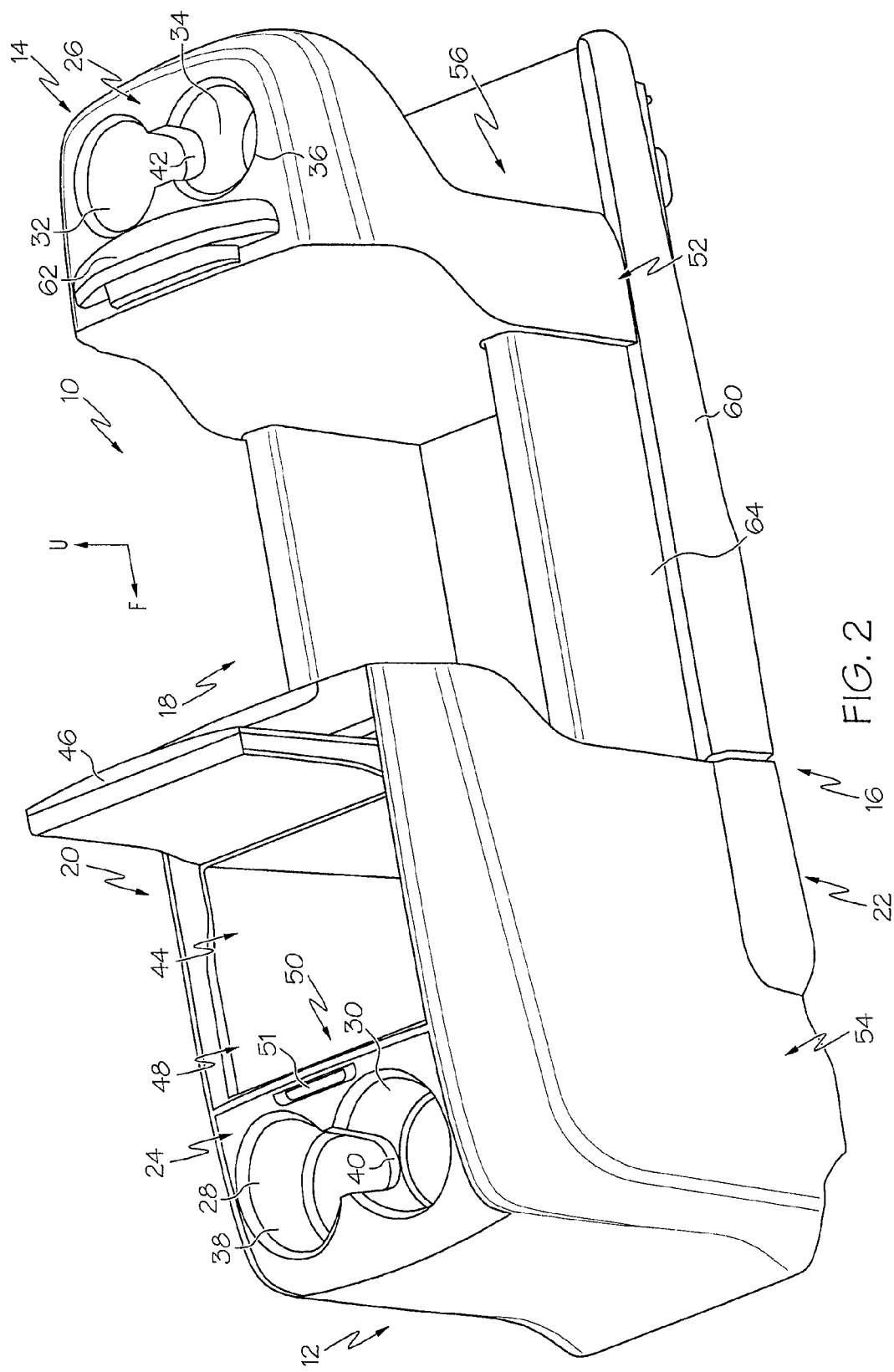
FIG. 2 is a perspective view of the console assembly of FIG. 1 in an expanded configuration according to one or more embodiments shown and described herein.

FIGS. 1 and 2 generally depict one exemplary embodiment of a console assembly 10 for a vehicle where arrows F and U denote forward and upward directions of the vehicle. The console assembly 10 is generally box-shaped and includes a front 12 facing forward, a rear 14 facing rearward, sides 16 and 18 facing widthwise outward, a top 20 facing upward and a bottom 22 facing downward. The console assembly 10 may be located at any suitable position within a vehicle, such as between front seats, between rear seats, etc. The console assembly 10 may be used with any suitable vehicle, such as automobiles, airplanes, boats, etc. In one embodiment, the console assembly 10 is a center console assembly that is located between seats of an automobile. For example, the console assembly 10 may be located between front seats of an automobile.

Cup holder assemblies 24 and 26 are located at the top 20 of the console assembly 10. Cup holder assembly 24 is located nearer the front 12 and includes cup holders 28 and 30 located side-by-side and extending toward the bottom 22 of the console assembly 10. Cup holder assembly 26 is located nearer the rear 14 and includes cup holders 32 and 34 located side-by-side and extending toward the bottom 22 of the console assembly 10. Each cup holder 28, 30, 32 and 34 may generally include an upward facing opening 36 sized to receive a bottom portion of a cup and a downwardly extending sidewall 38 forming cup-receiving volumes that can be used to hold a cup therein. A recess 40 and 42 may be provided between cup holders 28 and 30 and cup holders 32 and 34. The recesses 40 and 42 may provide for storage of travel mugs and cups and increased accessibility to travel mugs and cups located within the cup holders 28, 30, 32 and 34.

A storage bin 44 may be located between the cup holder assemblies 24 and 26. A door 46 has an open position (FIG. 2) and a closed position (FIG. 1) for providing access to the storage bin 44 through an access opening 48. A release mechanism (generally referred to as element 50) may be provided for latching and unlatching the door 46. A button 51 or other suitable unlatching device may be provided for controlling the release mechanism 50. In some embodiments, the door 46 may be biased (e.g., using a spring) toward the open position. In another embodiment, the door 46 may be openable manually.

In some embodiments, a rear portion 52 of the console assembly 10 may be moveable between a compact configuration (FIG. 1) and an expanded configuration (FIG. 2). In the exemplary embodiment of FIGS. 1 and 2, the console assembly 10 may include a front portion 54 and the rear portion 52. The rear portion 52 may be moveable relative to the front portion 54. In some embodiments, a support structure such as a track portion 56 may extend horizontally rearward from the front portion 54 that includes side rails 58 and 60. The rear portion 52 may slide along the rails 58 and 60 between the compact configuration with the rear portion 52 nearer the front of the vehicle and the expanded configuration with the rear portion 52 nearer the rear of the vehicle. A handle 62 or other graspable structure may be provided for use in moving the rear portion 52 relative to the front portion 54. A drawer 64 may extend between the rear portion 52 and the front portion 54. The drawer 64 may be received within the front portion 54 with the rear portion 52 in the compact configuration. As shown in FIG. 2, sliding the rear portion 52 to the expanded configuration can expose the drawer 64, for example, to allow contents of the drawer 64 to be removed.

As noted above, the console assembly 10 includes a lighting system 66 for illuminating areas within the console assembly 10. The lighting system 66 may be used to light one or more of the cup holder assemblies 24 and 26, the storage bin 44 and the drawer 64. In the illustrated embodiment, the lighting system 66 may be used to illuminate the cup holder assembly 24 including both cup holders 28 and 30 and the storage bin 44.

Figure 3:
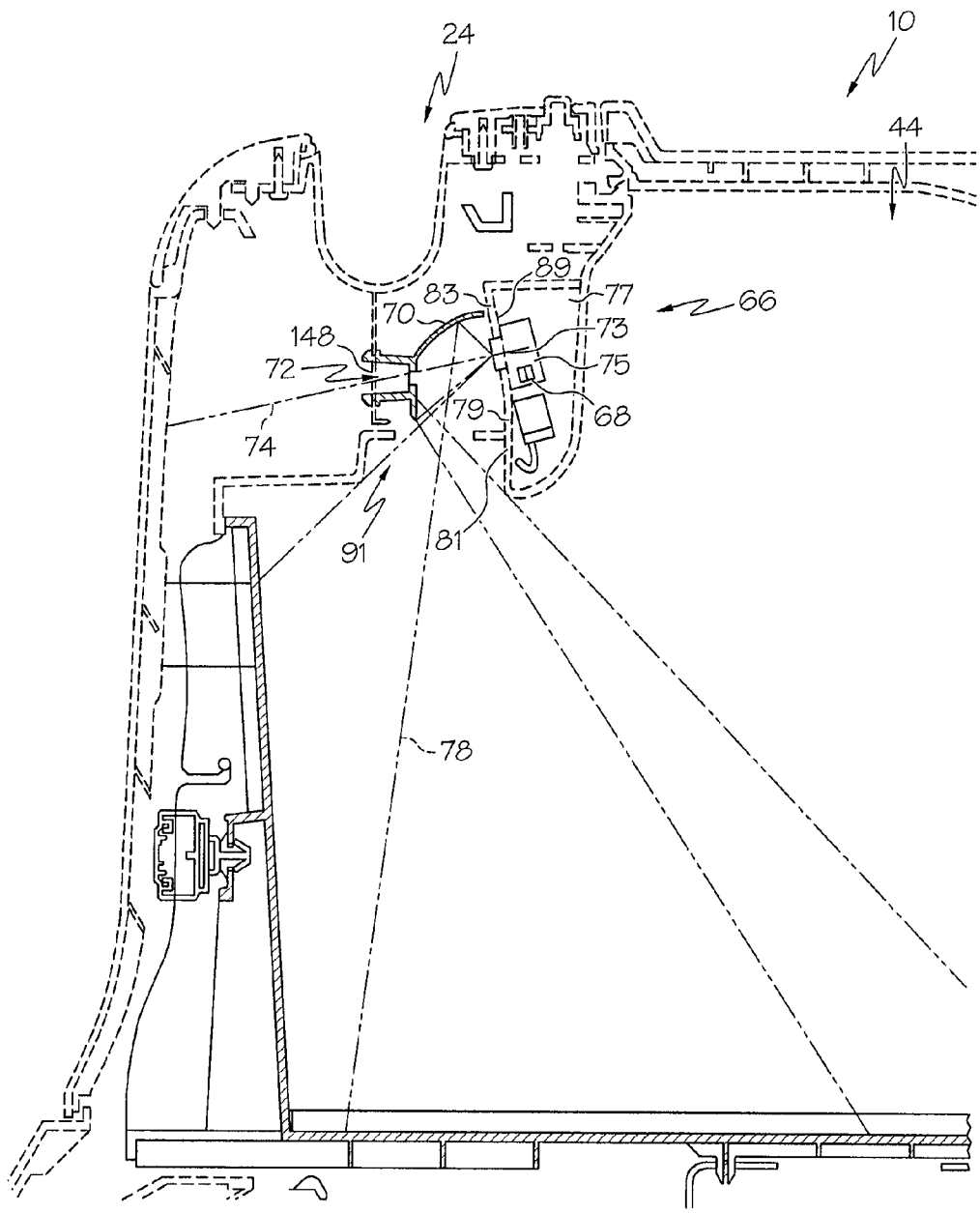
FIG. 3 is a diagrammatic section view of a portion of an interior of the console assembly of FIG. 1 illustrating a lighting system according to one or more embodiments shown and described herein.

Referring now to FIG. 3, the exemplary lighting system 66 generally includes a light source assembly 68, a lens cover 70 and a lens 72. The light source assembly 68 may generally include a light source 73 (e.g., a single point light source such as an LED) and a housing 75. The housing 75 may be mounted within a compartment 77 located adjacent the cup holder assembly 24 and between the storage bin 44 and the cup holder assembly 24. A wall panel 79 may be provided on which the light source assembly 68 is mounted. The wall panel 79 may include a generally vertical portion 81 and a portion 83 that is offset from vertical. The offset portion 83 may include an opening 89 through which the light is directed. The housing 75 maybe mounted to the offset portion 83 of the wall panel 79 such that light generated by the light source 73 is directed in a generally downward direction, offset slightly from the horizontal. A light passageway 91 (e.g., an opening) may be provided beneath the cup holder assembly 24 to allow light to pass therethrough and into the storage bin 44. As will be described in greater detail below, the lens cover 70 may be used to connect the lens 72 to the cup holder assembly 24 so that the lens cover 70 and the lens 72 can be used to distribute light within multiple regions of the console assembly 10. As represented by dashed line 74, the lens cover 70 and the lens 72 may allow light to pass therethrough and into the cup holders 28 and 30. The lens cover 70 may also be configured to reflect light through the light passageway 91 and back into a storage volume 76 of the storage bin 44 as represented by dashed lines 78.

Figure 4:
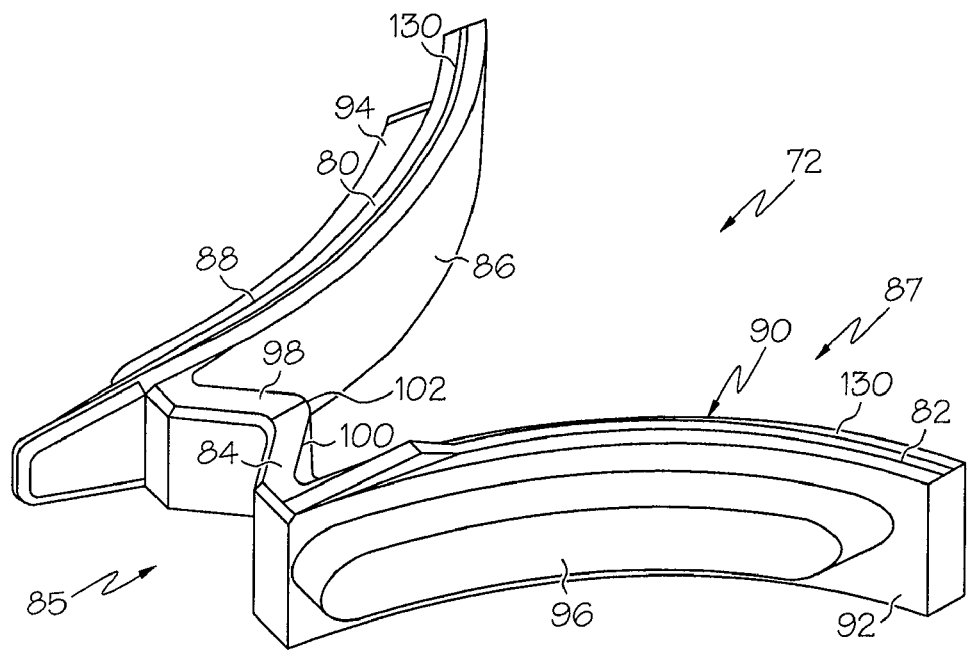
FIG. 4 is a perspective view of a lens for use with the lighting system of FIG. 3 according to one or more embodiments shown and described herein.
Figure 5:
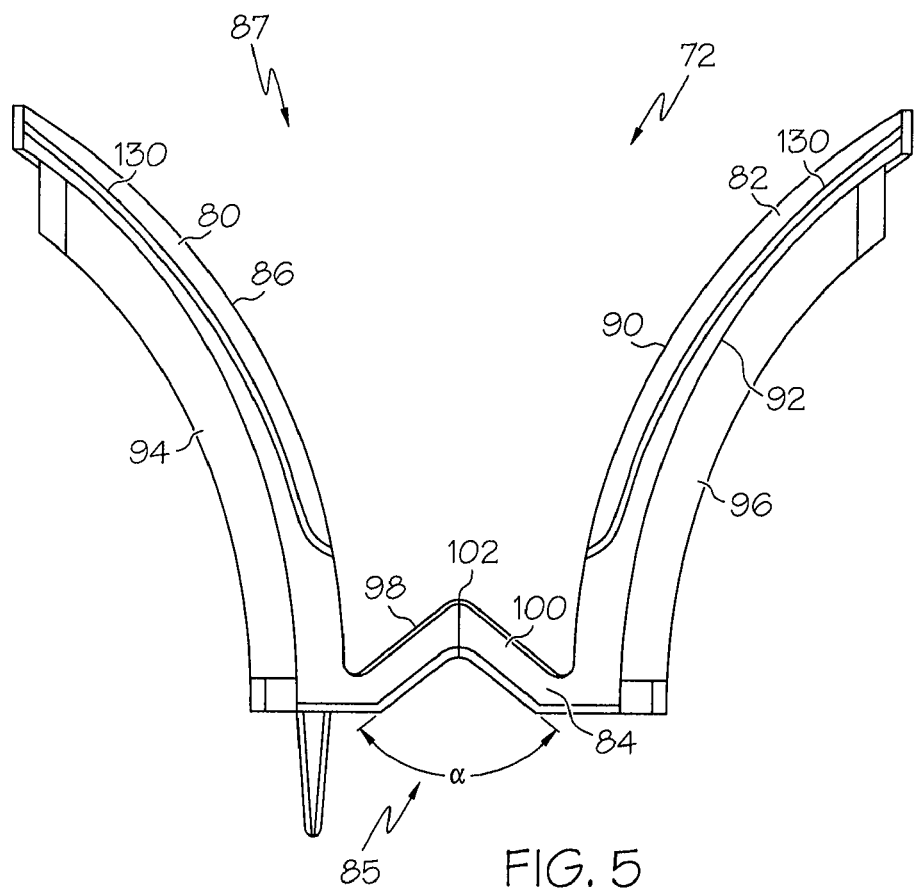
FIG. 5 is a top view of the lens of FIG. 4 according to one or more embodiments shown and described herein.
Figure 6:
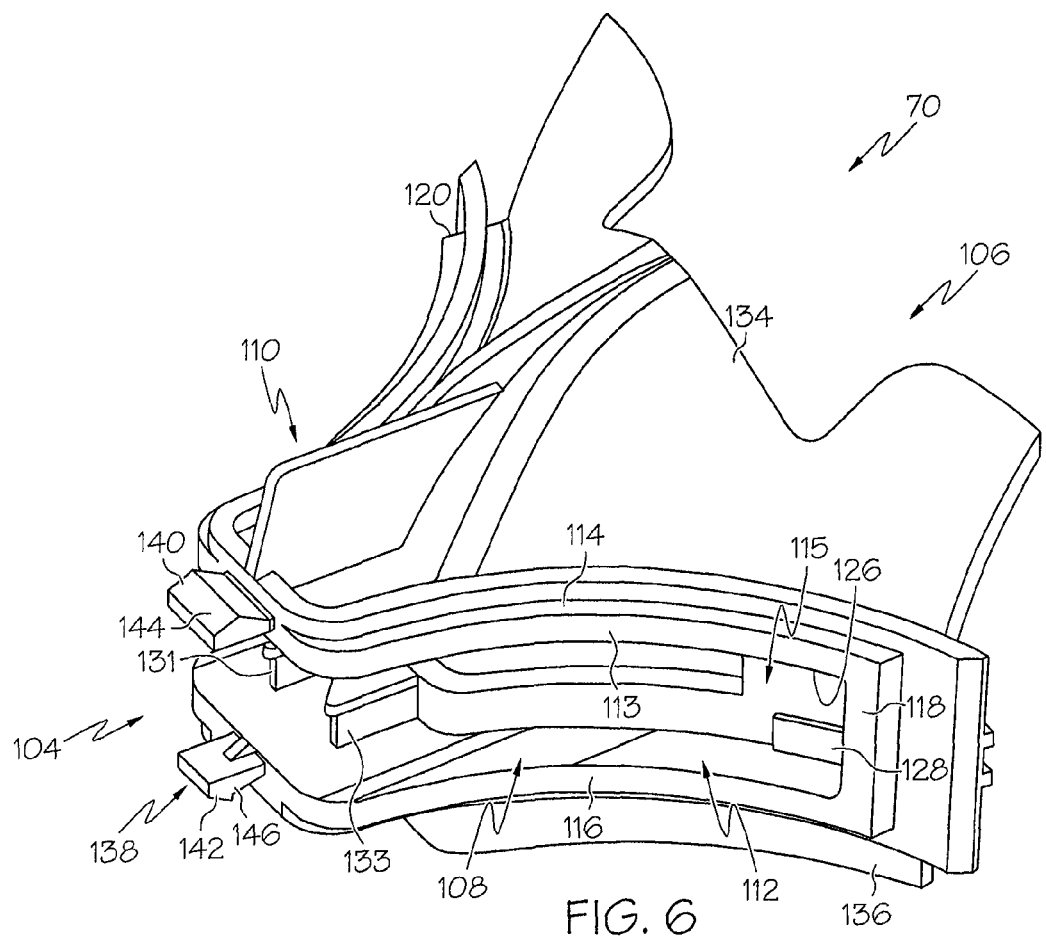
FIG. 6 is a perspective view of a lens cover for use with the lighting system of FIG. 3 according to one or more embodiments shown and described herein.
Figure 7:
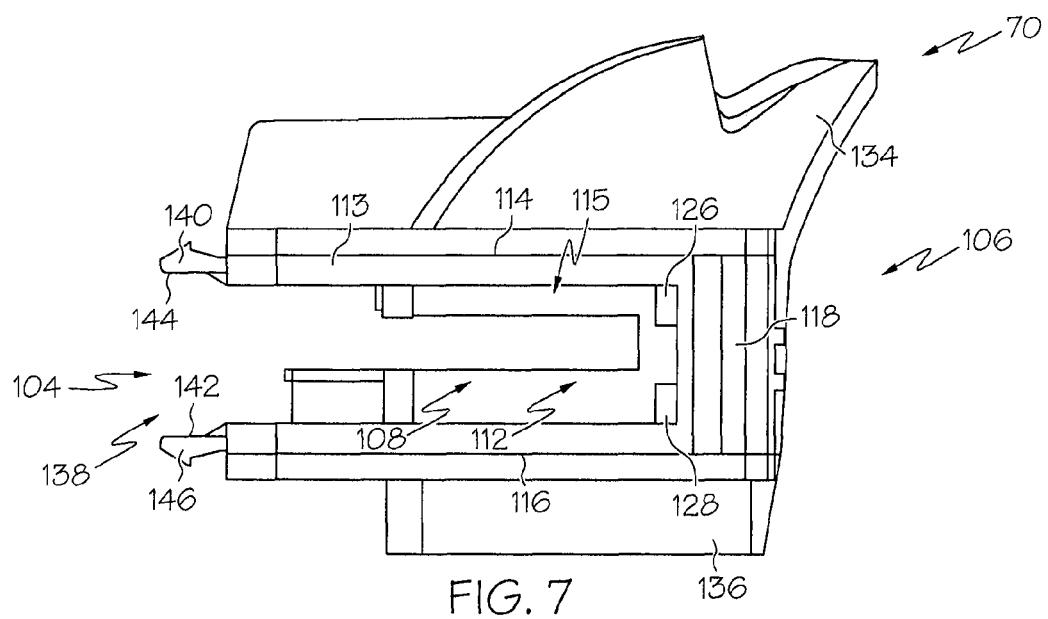
FIG. 7 is a side view of the lens cover of FIG. 6 according to one or more embodiments shown and described herein.
Figure 8:
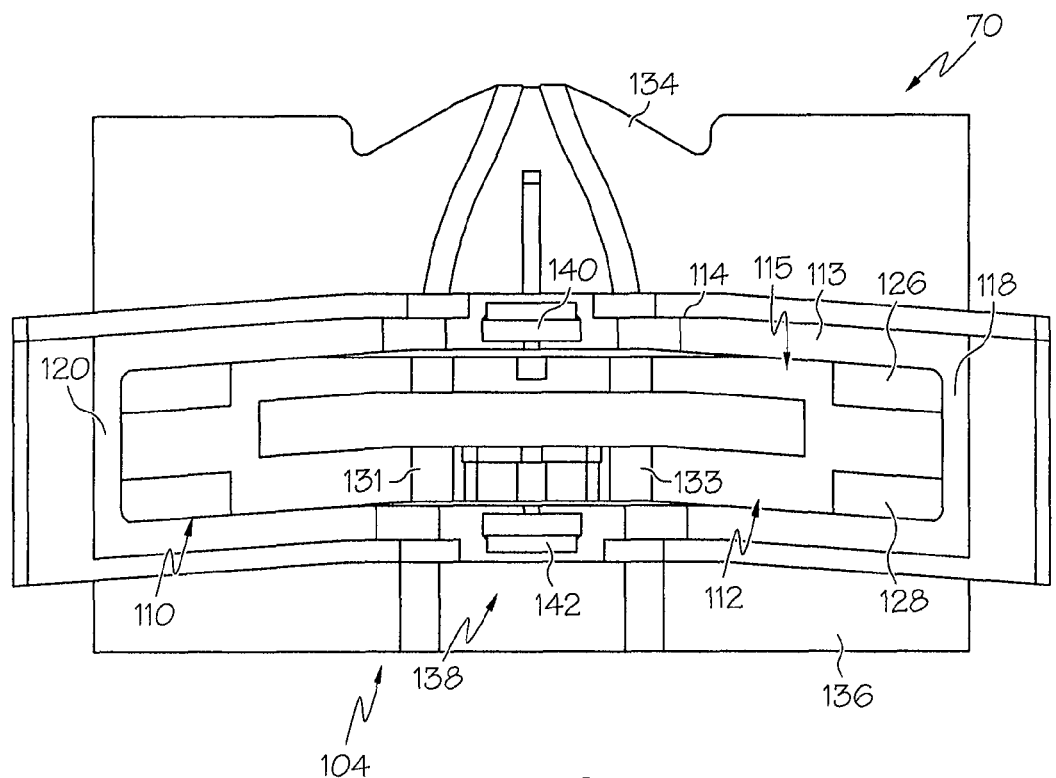
FIG. 8 is a front view of the lens cover of FIG. 6 according to one or more embodiments shown and described herein.
Figure 9:
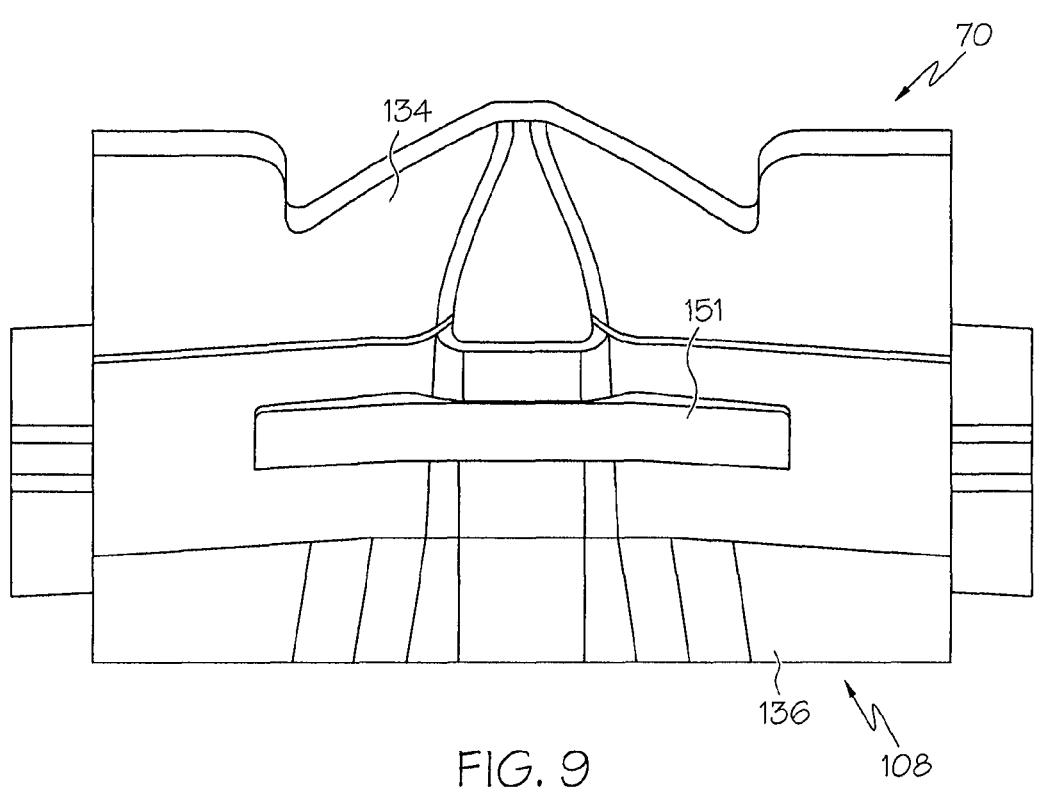
FIG. 9 is a rear view of the lens cover of FIG. 6 according to one or more embodiments shown and described herein.

Referring to FIGS. 4 and 5, the lens 72 may generally include a front end 85, a rear end 87, a first arm portion 80 and a second arm portion 82 connected by a connector portion 84. The first and second arm portions 80 and 82 extend generally rearwardly when connected to the cup holder assembly 24, forming a somewhat V or W-shape. The first arm portion 80 includes an exterior convex surface 86 that faces away from the cup holder 28 and an interior concave surface 88 that faces toward the cup holder 28. The second arm portion 82 includes an exterior convex surface 90 that faces away from the cup holder 30 and an interior concave surface 92 that faces toward the cup holder 30. A rib 94 and 96 is provided on the interior concave surfaces 88 and 92 that extends along the lengths of the first arm portion 80 and the second arm portion 82.

The connector portion 84 connects the first arm portion 80 and the second arm portion 82. The connector portion 84 includes a first wall 98 that is slanted rearward and a second wall 100 that is slanted rearward. The first wall 98 and the second wall 100 may come together at an apex 102 at the rearmost portion of the connector portion 84. An angle a between the first wall 98 and the second wall 100 may be about 90 degrees or less, such as about 75 degrees or less, such as about 60 degrees or less.

The interior concave surfaces 88 and 92 are generally shaped to match an outer contour of the cup holder assembly 24, as will be described below. The entire lens 72 may be formed (e.g., by molding) of a single piece of transparent or translucent material such as plastic, glass, etc. In other embodiments, the lens 72 may be formed of different materials. In some embodiments, the lens 72 may be formed of a transparent material having a color such as blue, yellow, red etc. In some embodiments, a film formed of a material having a color may be applied to a surface of the lens.

Referring to FIGS. 6-9, the lens cover 70 may generally include a front end 104 and a rear end 106. A lens holding structure 108 extends from the rear end 106 to the front end 104 in a somewhat V-shape. The lens holding structure 108 includes a first arm receiving portion 110 that is configured to receive the first arm portion 80 of the lens 72 and a second arm receiving portion 112 that is configured to receive the second arm portion 82 of the lens 72. The lens holding structure 108 may include a peripheral frame 1 13 forming a gap 115 between a top 114, bottom 116 and sides 118 and 120 of the frame that is sized to receive the first arm portion 80 and the second arm portion 82 of the lens 72 therein. Catch members 122, 124, 126 and 128, e.g., in the form of relatively short cantilevered bars may be provided to capture the lens 72 within the lens holding structure 108. Guide members 131 and 133 may be provided to receive the connecting portion 84 of the lens 72 and may be used to center the lens 72 in the lens cover 70. In some embodiments, the guide members 131 and 133 may together form a V-shaped receiving recess for receiving the connecting portion 84 of the lens 72. In some embodiments, a snap fit connection, for example, using a groove 130 and a rib 132 may be provided for releasably connecting the lens 72 to the lens holding structure 108. In some embodiments, adhesives, welding, etc. may be used to connect the lens 72 to the lens holding structure 108.

The lens cover 70 may further include an upper reflecting wall 134 and a lower reflecting wall 136. The upper reflecting wall 134 may extend upwardly and curves rearwardly while the lower reflecting wall 136 extends substantially vertically. Other configurations are possible. For example, the lower reflecting wall 136 may curve rearwardly and/or the upper reflecting wall 134 may be substantially vertical. An attachment structure 138 may be provided to connect the lens cover and lens assembly to the cup holder assembly 24. In the illustrated embodiment, the attachment structure 138 is a clip that includes clip arms 140 and 142. The clip arms 140 and 142 include a hook portion 144 and 146 that is used to hook an opening 148 in the cup holder assembly 24 (FIG. 3).

The entire lens cover 70 may be formed (e.g., by molding) of a single piece of material such as plastic, glass, etc. In some embodiments, a color of the material is chosen for its reflective properties, such as a white plastic. In some embodiments, the lens cover 70 may be formed of different materials. In some embodiments, a film formed of a highly reflective material (e.g., a foil, paint, chrome or other material and/or surface treatment) may be applied to the surface of the upper reflecting wall 134 and/or the lower reflecting wall 136.

Figure 10:
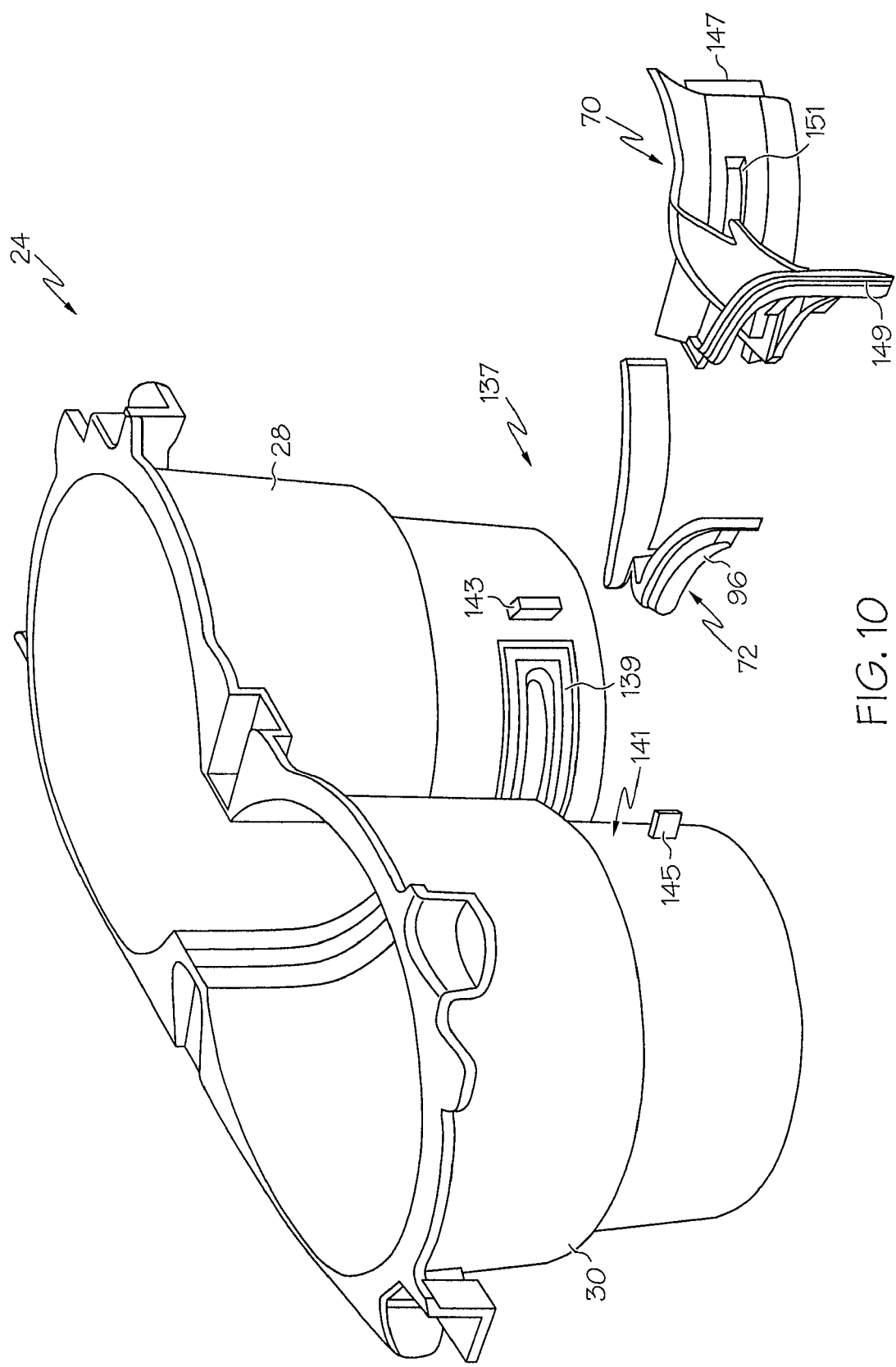
FIG. 10 is an exploded view illustrating assembly of the lens and lens cover to cup holders according to one or more embodiments shown and described herein.
Figure 11:
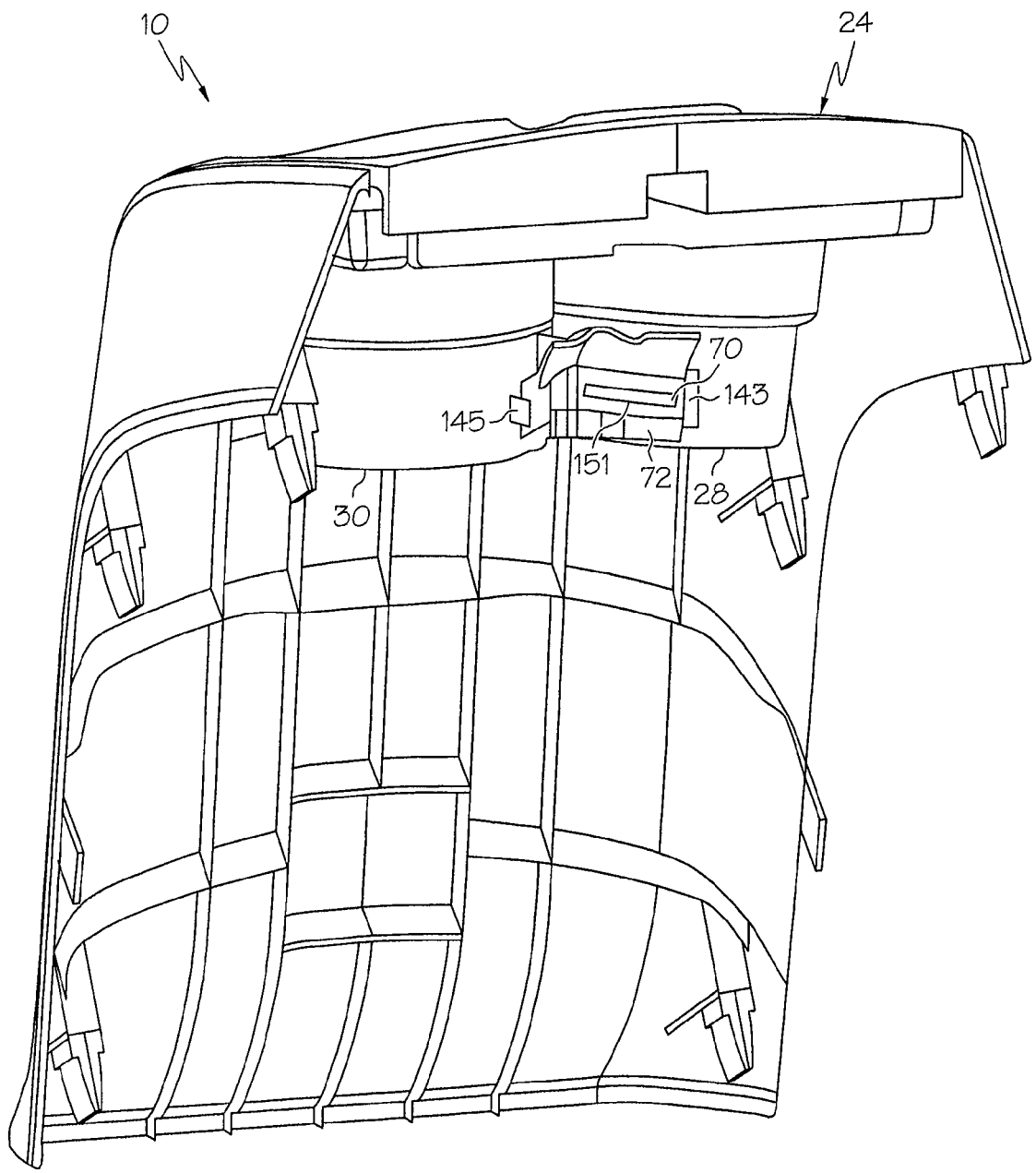
FIG. 11 is an assembled view of the assembly of FIG. 10 according to one or more embodiments shown and described herein.

Referring to FIGS. 10 and 11, the cup holders 28 and 30 both include connection structure 137 for use in connecting the lens 72 and the lens cover 70 to the cup holders 28 and 30. An elongated opening 139 and 141 may extend horizontally along the periphery of the cup holders 28 and 30. Clip structures 143 and 145 may be provided to clip ends 147 and 149 of the lens cover 70 to the cup holders 28 and 30. As can be seen in FIG. 11, the lens 72 may be clipped or otherwise attached between the cup holders 28 and 30 and the lens cover 70. In some embodiments, the ribs 94 and 96 are sized to be received in the openings 139 and 141 to locate the lens 72 adjacent the openings 139 and 141 and attach the lens 72 to the cup holders 28 and 30. A widthwise opening 151 may provided in the lens cover 70 through which the lens 72 can be exposed. The upper reflective wall 134 extends in a direction away from the cup holders 28 and 30. The lower reflective wall 136 extends vertically down alongside the cup holders 28 and 30.

Figure 12:
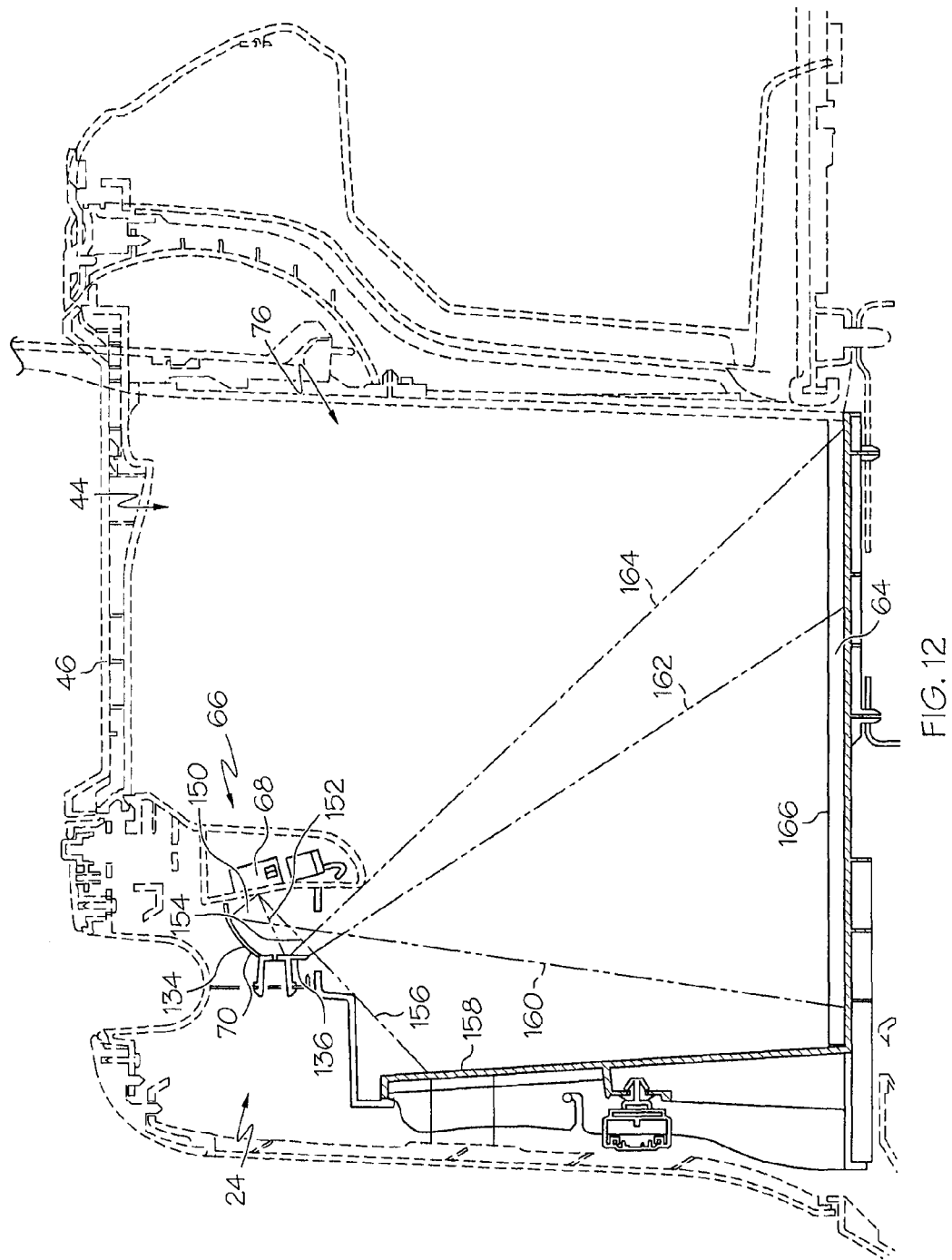
FIG. 12 is a diagrammatic section view of the lighting system in use within the console assembly according to one or more embodiments shown and described herein.
Figure 13:
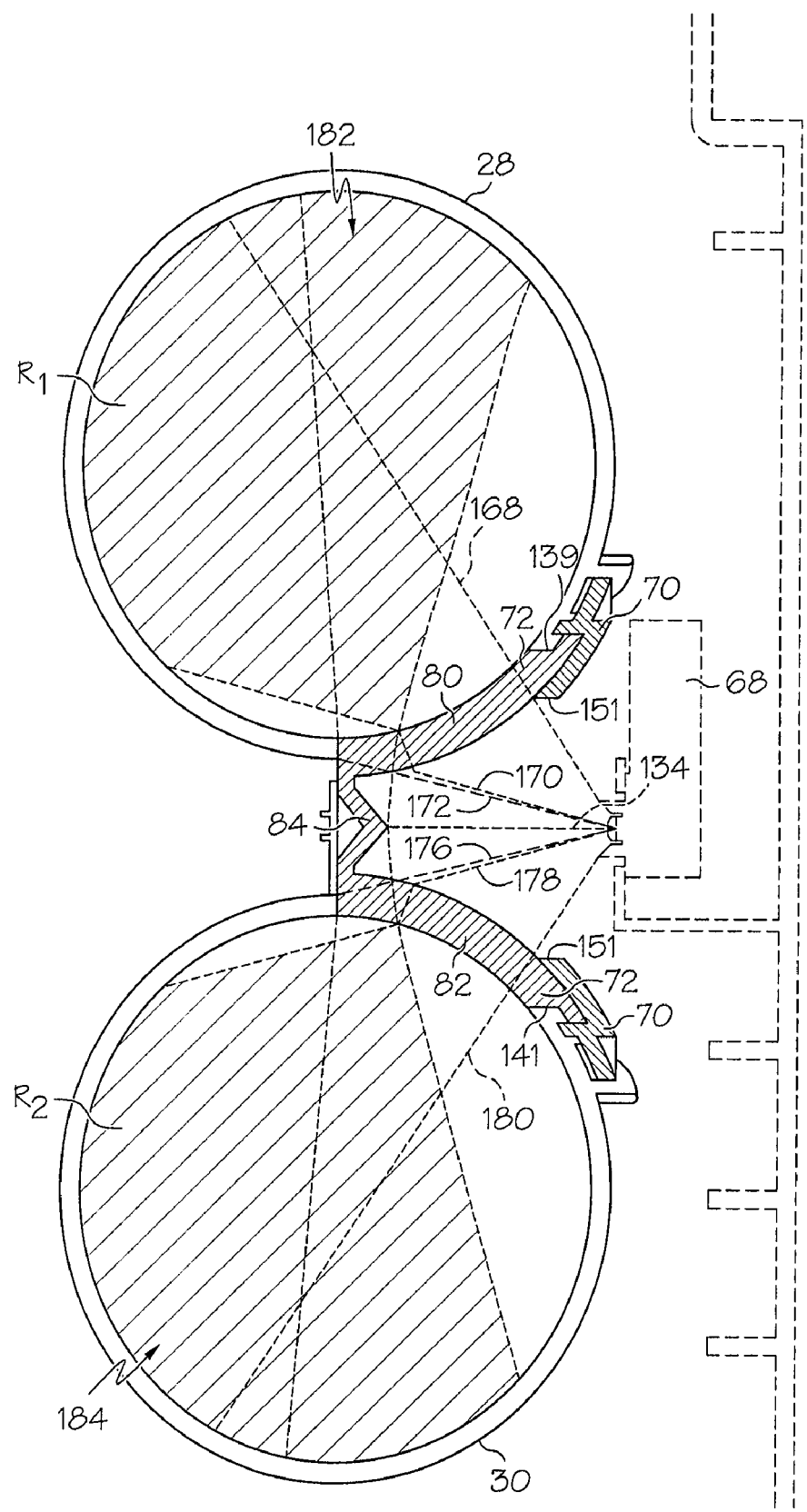
FIG. 13 is a diagrammatic section view of the lighting system in use within the console assembly according to one or more embodiments shown and described herein.

Referring to FIGS. 12 and 13, the above-described lighting system 66 maybe used to illuminate both cup holders 28 and 30 and the storage bin 44 simultaneously using the light source assembly 68. Referring to FIG. 12, light generated by the light source assembly 68 represented by lines 150, 152 and 154 may indirectly illuminate the storage volume 76 by reflecting from the upper reflective wall 134 and the lower reflective wall 136 of the lens cover 70. As can be seen, the upper reflective wall 134 may be shaped (e.g., curved rearwardly) to reflect light incident thereon downwardly and forward toward a front portion of the storage volume 76 and beneath the cup holder assembly 24 (see reflected light 160). The upper reflective wall 134 may also be shaped to reflect light toward a rear portion of the storage volume. The lower reflective wall 136 maybe shaped (e.g., vertically) to reflect light incident thereon rearward toward a rear portion of the storage volume underneath the door 46. In some embodiments, as represented by line 156, some of the light generated by the light source assembly 68 may bypass the lens cover 70 and directly illuminate the storage volume 76. In the illustrated example, the light 156 bypasses the lens cover and is incident on a front wall 158 of the storage bin 44. Reflected light 160, 162 and 164 reflects from the lens cover 70 and is incident on a bottom 166 of the storage bin 44. In some embodiments, the bottom 166 is formed by the drawer 64. Thus, in some embodiments, the light source assembly 68 and lens cover 70 may be used to illuminate the drawer 64, even with the rear portion 52 in the expanded configuration.

Referring to FIG. 13, while some of the light generated by the light source assembly 68 may be reflected by the lens cover 70 back into the storage bin 44, some of the light generated by the light source assembly 68 may enter both cup holders 28 and 30. Light generated by the light source assembly 68, represented by lines 168, 170, 172, 174, 176, 178 and 180, passes through the opening 151 in the lens cover 70, through the lens 72, through the openings 139 and 141 in the cup holders 28 and 30 and into cup-receiving volumes 182 and 184.

The shapes of the lens 72 including the first arm portion 80, the second arm portion 82 and the connector portion 84 and the material forming the lens 72 may be selected to distribute the light within the cup-receiving volumes 182 and 184. For example, light 168 that is incident on the lens 72 at an angle substantially perpendicular to the exterior surface 86 may generally pass through the lens material without changing its direction of travel. Light 170 that is incident on the lens 72 at certain angles refracts and changes direction toward the cup-receiving volume 182 as it passes through the lens material due to the difference in refractive index between the lens material and the surrounding air. The light 170 exiting the lens 72 again changes direction as it re-enters the less dense air medium. The refractive properties of the lens 72 may be used to distribute the light from the light source assembly 68 over a greater percentage of the cup-receiving volumes 182 and 184. The connector portion 84 may be V-shaped, creating an angle of incidence that may be used to reflect the light 174 toward a rear portion of the cup holders 28 and 30, in a direction toward the light source assembly 68. Reflecting the light 170 toward a rear portion of the cup-receiving volumes 182 and 184 can increase an illumination range of the lighting system 66 as represented by the shaded regions $R_1$ and $R_2$.

In some embodiments, the lens 72 may be formed of a transparent material having a color, such as blue, red, green, etc. for generating light having color. In some embodiments, the color of the light illuminating the cup holders 28 and 30 may be different than the color of light illuminating the storage bin 44. For example, the light source assembly 68 may generate white light and the lens 72 may be formed of a blue material. Light passing through the lens 72 and into the cup-receiving volumes 182 and 184 may be blue in color. In some of these embodiments, the lens cover 70 may be formed of a white material. White light reflected off of the lens cover 70 and into the storage bin 44 may be white. Providing a contrast in the lighting may be used to differentiate the cup holders 28 and 30 from the storage bin 44.

The above-described lighting system 66 may utilize a single light source 73 for illuminating multiple regions within the console assembly 10. In the illustrated embodiment, the light source 73 may be used to illuminate the cup holders 28 and 30 directly by passing light through the lens 72 and to illuminate the storage bin 44 indirectly through light reflected from the lens cover 70. The term "direct lighting" or illuminating directly may refer to lighting provided from a source without reflection from other surfaces. The term "indirect lighting" or illuminating indirectly may refer to lighting provided from a source reflected from other surfaces. The lens 72 and the lens cover 70 may be shaped to increase an illumination range in the cup holders 28 and 30 and the storage bin 44. Using a single light source 73 to effectively illuminate both cup holders 28 and 30 and the storage bin 44 can reduce cost and power consumption compared to the use of multiple light source to illuminate multiple regions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A console assembly including a lighting assembly for illuminating the console assembly, the console assembly comprising:
   a cup holder assembly in the console assembly including a cup holder including a side wall at least partially defining a cup-receiving volume;
   a storage bin in the console assembly having a storage volume; and
   a light source assembly mounted within a compartment in the console assembly;
   wherein the cup-receiving volume is illuminated by directing light through an opening in the side wall of the cup holder and the storage volume is illuminated using reflected light passing through a passageway in the compartment.

2. The console assembly of claim 1 further comprising a lens at the opening in the side wall of the cup holder, the light directed through the opening in the side wall of the cup holder passing through the lens.

3. The console assembly of claim 2 further comprising a lens holder connected to the side wall of the cup holder having a reflective wall that reflects the reflected light through the passageway in the compartment.

4. The console assembly of claim 2, wherein the lens is formed of a material having color such that light illuminating the cup-receiving volume is of a different color than light illuminating the storage volume.

5. A console assembly for a vehicle, the console assembly comprising:
   a cup holder assembly having a first cup holder having a first cup-receiving volume and a second cup holder having a second cup-receiving volume;
   a lighting assembly including a single light source mounted within the console that illuminates both the first cup-receiving volume and the second cup receiving volume directly through a lens including a first arm portion connected to the first cup holder and a second arm portion connected to the second cup holder;
   a lens cover at least partially covering the lens; and
   a storage bin positioned proximate the cup holder assembly;
   wherein the lens cover reflects light from the light source into the storage bin to illuminate the storage bin indirectly using the light source.

6. The console assembly of claim 5, wherein the lens cover includes an upper reflective wall having a contoured surface that curves away from the cup holder, the upper reflective surface being shaped to reflect light from the light source into the storage bin.

7. The console assembly of claim 6, wherein the lens cover includes an opening that exposes the lens to the lighting assembly such that light from the lighting assembly passes through the lens and into the first and second cup receiving volumes.

8. The console assembly of claim 5, wherein the first cup holder has a first opening in a sidewall of the first cup holder and the second cup holder has a second opening in a sidewall of the second cup holder, the first arm portion arranged such that light passing through the first arm portion passes through the first opening of the first cup holder and light passing through the second arm portion passes through the second opening in the second cup holder.

9. The console assembly of claim 8, wherein the lens is molded from a single plastic material having a color to provide light having a color in the cup-receiving volume.

10. The console assembly of claim 8, wherein the first and second arm portions extend generally rearwardly and are each received within one of the first and second openings in the sidewalls of the first cup holder and the second cup holder.

11. A console assembly of a vehicle comprising:
    a cup holder assembly in the console assembly having a cup-receiving volume;
    a storage bin in the console assembly having a storage volume; and
    a light source assembly mounted within the console assembly, wherein the light source assembly illuminates the cup-receiving volume directly and illuminates the storage bin indirectly.

12. The console assembly of claim 11, wherein the cup holder assembly comprises a first cup holder and a second cup holder, each first and second cup holder having the cup-receiving volume, wherein the light source assembly illuminates both cup-receiving volumes of the first and second cup holders.

13. The console assembly of claim 11, wherein the cup holder assembly comprises a cup holder having an opening in a sidewall of the cup holder.

14. The console assembly of claim 13 further comprising a lens attached to the cup holder at the opening in the sidewall of the cup holder.

15. The console assembly of claim 14, wherein the lens is molded from a single plastic material having a color to provide light having a color in the cup-receiving volume.

16. The console assembly of claim 14, wherein the lens includes a first arm portion and a second arm portion connected by a connector portion, the first and second arm portions extend generally rearwardly as connected to the cup holder assembly.

17. The console assembly of claim 14 further comprising a lens cover at least partially covering the lens.

18. The console assembly of claim 17, wherein the lens cover includes an upper reflective wall having a contoured surface that curves away from the cup holder, the upper reflective surface being shaped to reflect light from the light source into the storage bin.

19. The console assembly of claim 17, wherein the lens cover includes an opening that exposes the lens to the light source assembly such that light from the light source assembly passes through the lens and into the cup receiving volume.

* * * * *